Figure 1:
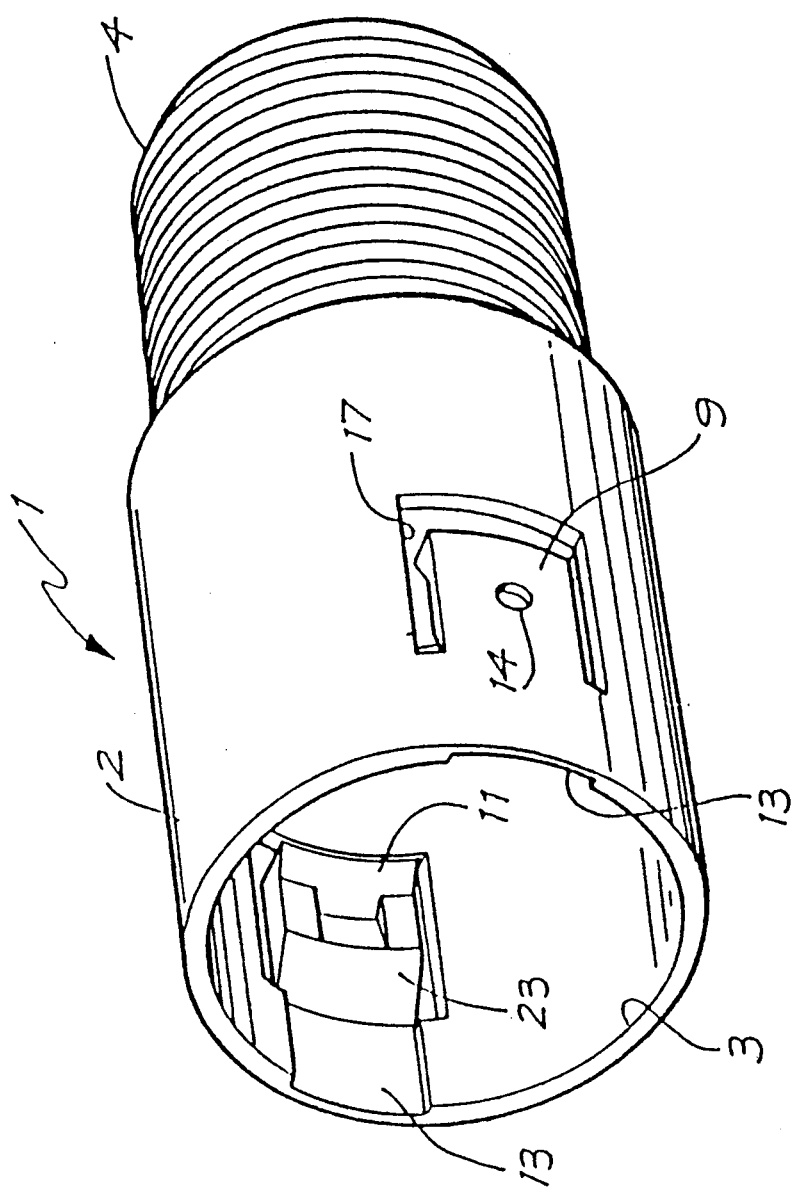

United States Patent [19]

Petty et al.

[11] Patent Number: 5,041,256

[45] Date of Patent: Aug. 20, 1991

[54] METHOD FOR FORMING CORRUGATED PLASTIC PIPE CONNECTOR

[76] Inventors: John Petty, 139 Lower Washington Dr., Bonnet Bay, Australia, 2226; Sandy McNeil, 33 Alexandra Street, Hunters Hill, NSW, Australia, 2110

[21] Appl. No.: 479,311

[22] Filed: Feb. 13, 1990

Related U.S. Application Data

[62] Division of Ser. No. 137,539, Nov. 17, 1987, Pat. No. 4,923,227.

[30] Foreign Application Priority Data

Feb. 5, 1986 [AU] Australia .............................. PH4459

[51] Int. Cl.⁵ ............................................ B29C 45/44
[52] U.S. Cl. ...................................... 264/318; 249/63; 249/145; 425/438; 425/DIG. 58
[58] Field of Search ............... 264/318; 425/DIG. 58, 425/438; 249/59, 63, 145

[56] References Cited

U.S. PATENT DOCUMENTS

| | | | |
|---|---|---|---|
| 2,366,067 | 12/1944 | Smith | 285/260 |
| 2,869,099 | 1/1959 | Robinson | 285/319 |
| 3,695,643 | 10/1972 | Schmunk | 285/903 |
| 3,797,865 | 3/1974 | Ballentine | 285/260 |
| 3,933,378 | 1/1976 | Sandford et al. | 285/319 |
| 3,950,014 | 4/1976 | Doubleday | 285/921 |
| 4,030,850 | 6/1977 | Hyde | 285/921 |
| 4,441,745 | 4/1984 | Nicholas | 285/903 |
| 4,542,922 | 9/1985 | Grossaver | 285/903 |
| 4,575,133 | 3/1986 | Nattel | 285/921 |
| 4,622,198 | 11/1986 | Gallusser et al. | 264/318 |
| 4,630,850 | 12/1986 | Saka | 285/903 |
| 4,711,472 | 12/1987 | Schnell | 285/162 |
| 4,751,036 | 6/1988 | Barriac | 249/63 |

FOREIGN PATENT DOCUMENTS

| | | |
|---|---|---|
| 529172 | 11/1940 | Australia . |
| 112878 | 4/1941 | Australia . |
| 114982 | 4/1942 | Australia . |
| 268101 | 10/1964 | Australia . |
| 20720 | 4/1972 | Australia . |
| 1271473 | 6/1968 | Fed. Rep. of Germany . |
| 2906317 | 8/1979 | Fed. Rep. of Germany ...... 285/903 . |
| 1282994 | 7/1972 | United Kingdom . |

*Primary Examiner*—Jan H. Silbaugh
*Assistant Examiner*—Brian J. Eastley
*Attorney, Agent, or Firm*—Townsend and Townsend

[57] ABSTRACT

A liquid tight connector for affixing, in a liquid tight manner, to a conduit having a ridge located adjacent to its end, wherein the conduit extends into a bore (5) and abuts against a sealing surface (6) and is held in liquid tight engagement therewith. A locking member (9) projects into the bore (5) and locks on to the ridge of the conduit.

3 Claims, 3 Drawing Sheets

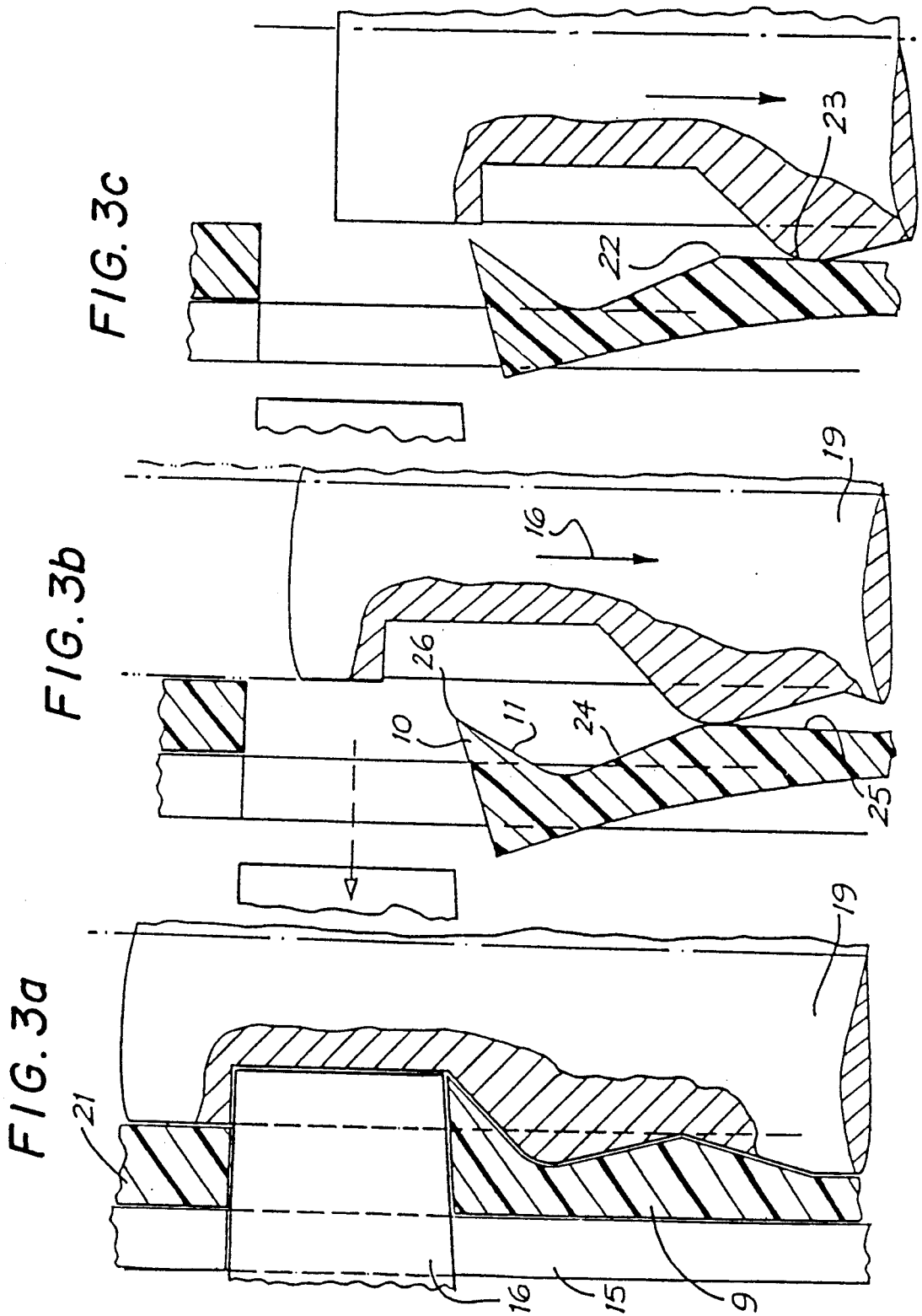

METHOD FOR FORMING CORRUGATED PLASTIC PIPE CONNECTOR

This is a division of application Ser. No. 137,539 filed Nov. 17, 1987, now U.S. Pat. No. 4,923,227.

The present invention relates to a liquid tight connector for corrugated piping or conduit.

With existing corrugated flexible conduit for drainage or electrical work, the only available methods of joining involves encasing the joint and gluing to ensure an adequate join. This type of joint must be left, so that the glue or adhesive sets, to ensure a successful join. This takes the tradesman additional time, and the chemistry of the glue weakens the conduit and the connector cannot be reused.

The present invention seeks to ameliorate this problem by providing a push-on connector which provides a liquid tight seal without the aid of adhesives, and which is reusable and adjustable during installation.

In one broad form the invention provides a liquid tight connector, for affixing, in a liquid tight manner, to a conduit having a ridge located adjacent to its end, comprising:

a body open at one end to receive a conduit in a bore communicating with said open end;

sealing means, in said bore, remote from said open end, which are adapted to seal against, in a liquid tight manner, the conduit pushed into the said bore; and locking means located in said body so as to project into the said bore so as to lock onto the ridge of conduit in said bore, so as to hold in said bore said conduit in a liquid tight seal against the said sealing means.

Preferably the sealing means is a tapered section of said bore which is adapted to compress and seal against the flexible conduit pushed into said bore.

Figure 2:
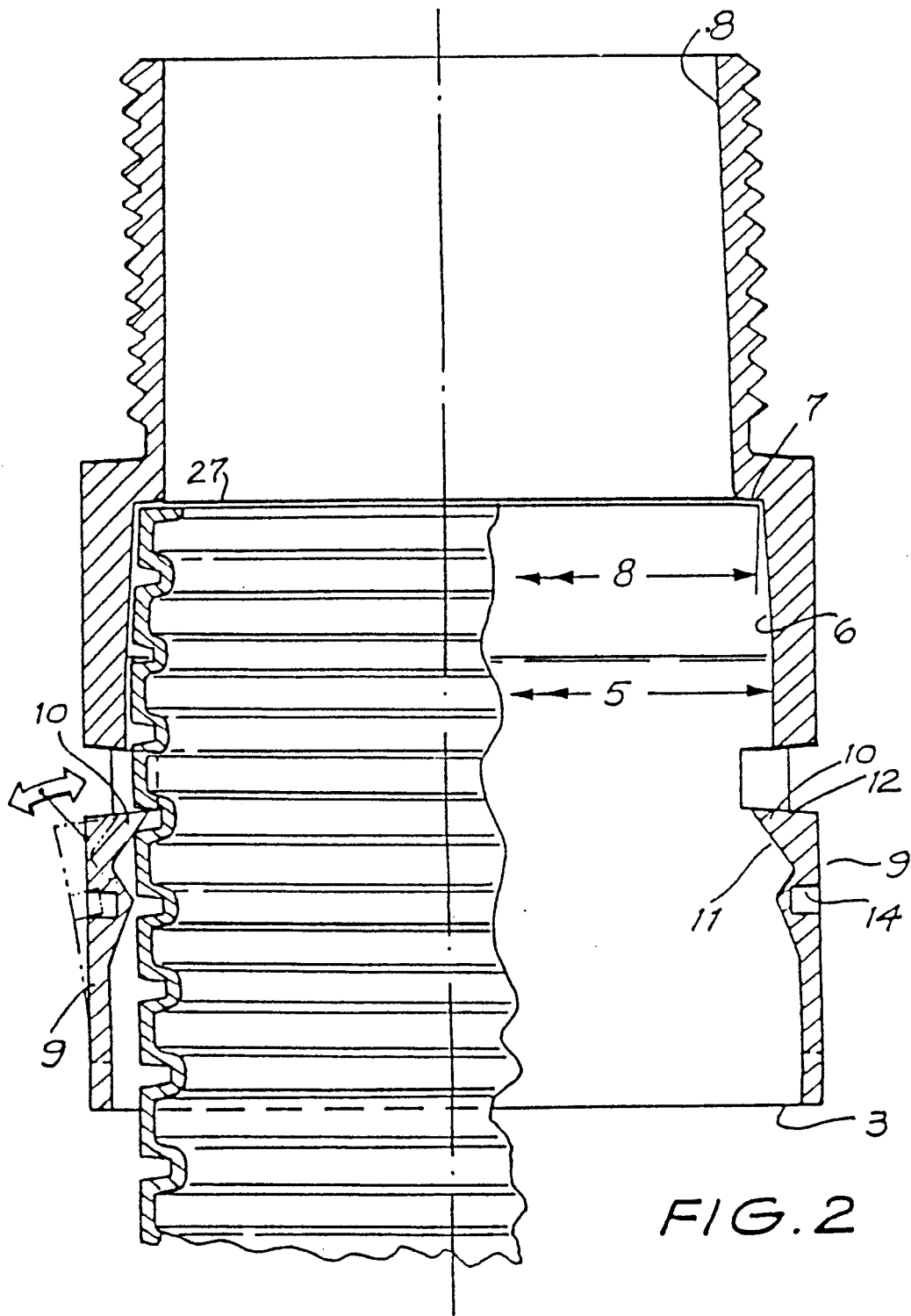

The connector of the present invention can be utilized with any form of fittings, such as elbows, junctions, Y and T pieces, terminators, junction boxes, or fittings joining corrugated piping to rigid piping or corrugated piping to corrugated piping The present invention will now be described by way of example with reference to the accompanying drawings in which:

FIG. 1 illustrates a perspective view of a connector according to an embodiment of the present invention;

FIG. 2 illustrates a sectional view of the connector illustrated in FIG. 1 with a corrugated conduit connected therein; and FIGS. 3a, 3b and 3c are part sectional views illustrating steps in the moulding of the locking means of the embodiment shown in FIG. 1. One embodiment of the present invention is illustrated in FIGS. 1 to 3 of the accompanying drawings. The connector 1 comprises a housing 2 having an open end 3 for insertion of the corrugated piping to effect connection thereto. The other end 4 is shown for threaded connection to a junction box or the like. However, this end could be designed for any type of connection or fitting. The bore 5 is chosen so as to be slightly oversize to the outer diameter of the corrugated flexible tubing.

The bore 5 as shown in FIG. 2 has a tapered section 6 located, remote from the end 3 and terminating in an annular shoulder 7, with a smaller diameter bore 8, in communication therewith. The shoulder could be of any desirable width.

Located intermediate the ends of the bore, in the constant diameter section, are two resilient locking members 9 formed in the walls of said bore 5, and having projections 10 which extend into the bore 5.

Thus, in clamping the connector 1 to a corrugated flexible piping as shown in FIG. 2, the piping is pushed into the bore 5; the projection 10 being so shaped that the corrugations bear on the ramp 11 and force projections 10 back out of the bore. The piping is then pushed into the tapered section 6 where it may abut against the annular shoulder 7. As the piping is forced further into the tapered section 6, the piping is compressed by the increasingly narrowing diameter of the tapered section, to form a liquid tight seal therewith. The projections 10 lock into a valley of the corrugations of the piping, such that the face 12 of the projection abuts up against a ridge of the corrugations, to prevent the piping from being withdrawn from the bore 5; the ridges being in a liquid tight seal against the walls of the tapered section.

In another form of the invention the tapered section of the bore could be replaced by a resilient seal which abuts against the end of the conduit or against the walls to form a liquid tight seal or the resilient seal could be utilized as well as the tapered section described before.

To assist in the working of the locking members 9, there is a recess 13 as shown in FIGS. 1 and 2 which produces a thin walled section joining the locking members to the connector. This greatly increases the resilience of the locking member, such that if the conduit is attempted to be removed, the force of the corrugations on the face 12 produces a bending moment on the locking member, drawing the projection 10 deeper into the valley of the conduit, to prevent withdrawal of the conduit from the connector.

With the above described locking means, the corrugated piping may be released by means of a suitable tool inserted in the opening 14, to force the projections out of the bore 5.

The present invention may be made from any suitable polymer, generally referred to in this application as plastic such as PVC or nylon, polypropylene, ABS, and can be used with pipes of varying sizes, for example, flexible plastic corrugated electrical conduit. The connector, as described above, can be utilized to form any desired connector, and could have any desired number of locking means as required.

The connector of the present invention could be moulded to a wall or a portion of a junction box, which wall or portion is releasably held in liquid tight relationship with the junction box, i.e. a groove and mating projection, or be able to be connected to a recess in a junction box by any suitable means, such as tapered swaged fit.

Because the connector in the preferred embodiment is a unitary plastics moulding, a special method of moulding had to be developed to allow for the formation of the locking members 9.

This method will now be described by way of example with reference to FIGS. 3a, 3b and 3c, which shows a part sectional view of one embodiment of the connector in the area of the locking member during moulding The external mould 15 comprises a moving core 16 which forms the U-shaped cut-out 17, as shown in FIG. 1. This projection mates with a recess in the internal mandrel 19, as shown in FIG. 3a, to form the locking member 9.

In profile as shown in FIG. 3a, the projection 10 extends into the bore 5 beyond the wall thickness 21, with the ramp 11 tapering back beyond the wall thickness, and rising again to the apex 22 at the level of the wall thickness 21, where it forms a ramp 25 which slopes to the recess 13.

When the material of the thus moulded connector has sufficiently solidified, the external mould 15 and its projection 16 are withdrawn as shown in FIG. 3b and the core pin 19 is withdrawn in the direction of the arrow 16. As the core pin 19 is withdrawn the ridge 23 as it bears on the ramp 24 forces the locking member outwardly from the bore 5, such that when the ridge 23 of the core pin 19 bears on the apex 22, the projection 10 is well clear of the core pin 19. Engagement of the ridge 23 with the slope 25 of the locking member as shown in FIG. 3c prevents the projection 10 from interfering with the core pin 19 as it is removed from the bore 5. This thereby ensures that the locking edge 26 of the projection 10 is not damaged by the core pin 19. The plastic memory of the locking member 9 causes the locking member to move from the deflected position of FIG. 3c to the position of FIG. 3a when the core 19 is removed.

It shall be obvious to people skilled in the art that the present invention could be used with corrugated conduit of any profile or could be used with non corrugated pipes having a ridge running around the pipe at a suitable distance from the end. The connector has applications for connection of electrical insulation piping, pool filtration and vacuum connections, vacuum cleaners, irrigation corrugated piping and lawn mower cable protection.

What is claimed is:

1. A method of moulding a hollow plastic article having a longitudinal bore, a recess in said article communicating with said bore, and having a longitudinally extending finger positioned in said recess, said finger having a projection extending into said bore and having on its underside a substantially transversely extending ridge, said finger further having a first ramp extending longitudinally from said ridge toward said projection and forming a valley therebetween; said method comprising:

providing a mould including a movable side mould to form the recess, and to be part of a mould to form the finger, and a central core to form the bore and the underside of said finger, said central core containing a recess to receive the movable mould; moulding plastic in said mould to form said hollow plastic article; then withdrawing the movable side mould; and then withdrawing the central core from the article such that a portion of the central core forming said valley of the underside of said finger bears on the first ramp and forces the projection clear of the central core, whereby the projection remains free of the core at least until after the recess in the central core has passed the axial position of the projection.

2. A method according to claim 1 wherein said finger returns by plastic memory to its moulded position after the central core is removed.

3. A method of moulding a hollow plastic article according to claim 1 wherein the mould includes an exterior die as well as a separately movable side mould.

* * * * *